United States Patent [19]

Mu

[11] Patent Number: 5,569,107
[45] Date of Patent: Oct. 29, 1996

[54] MULTI-STEP BICYCLE TRANSMISSION SPROCKET ASSEMBLY

[75] Inventor: Hsueh C. Mu, Taichung, Taiwan

[73] Assignee: Falcon Industrial Co., Ltd., Taichung Hsien, Taiwan

[21] Appl. No.: 455,399

[22] Filed: May 31, 1995

[51] Int. Cl.$^6$ .................................................. F16H 55/30
[52] U.S. Cl. ........................................ 474/160; 474/164
[58] Field of Search .................................. 474/152, 153, 474/160, 164

[56] References Cited

U.S. PATENT DOCUMENTS

| | | | |
|---|---|---|---|
| 4,889,521 | 12/1989 | Nagano | 474/164 |
| 5,162,022 | 11/1992 | Kobayasi | 474/155 |
| 5,437,582 | 8/1995 | Romano | 474/156 |

Primary Examiner—Roger J. Schoeppel
Attorney, Agent, or Firm—Browdy and Neimark

[57] ABSTRACT

A bicycle multi-step transmission sprocket assembly includes a large sprocket gear, an intermediate sprocket gear, and a small sprocket gear. The intermediate sprocket gear is provided in the top surface of a predetermined tooth with a first recess and is further provided with a chain guiding slot located in the back side of a plurality of adjoining teeth along the reverse revolving direction of the predetermined tooth. The large sprocket gear is provided in the top surface of a predetermined number of teeth thereof with a second recess corresponding in location to the chain guiding slot of the intermediate sprocket gear in the reverse revolving direction. The sprocket chain is capable of shifting from the small sprocket gear to the intermediate sprocket gear with speed, thanks to the first recess and the chain guiding slot of the intermediate sprocket gear. The second recess of the large sprocket gear serves to avert the deflection of the sprocket chain so as to eliminate the mechanical interference of the large sprocket gear by the sprocket chain when a transmission process is in progress.

8 Claims, 3 Drawing Sheets

MULTI-STEP BICYCLE TRANSMISSION SPROCKET ASSEMBLY

FIELD OF THE INVENTION

The present invention relates generally to a bicycle transmission mechanism, and more particularly to a multi-step transmission sprocket assembly of the bicycle transmission mechanism.

BACKGROUND OF THE INVENTION

The bicycle gear-shifting mechanism is generally composed of two sprocket sets and a sprocket chain fastening the two sprocket sets for transferring motion from one sprocket set to another. The sprocket sets are provided respectively with a cluster of gears having teeth of various sizes. The speed-changing process of bicycle is attained by an action of pulling the transmission cable so as to actuate the sprocket chain to move from one sprocket gear to another.

The smooth operation of such a bicycle gear-shifting mechanism as described above depends on the curved angle and the sideway deflection of the chain links of the sprocket chain. For this reason, the U.S. Pat. No. 4,889,521 discloses a bicycle sprocket assembly, which is constructed on the basis of a theory that the path, on which the sprocket chain is moved from the small sprocket gear to the large sprocket gear, is corresponding to a line tangent to the line formed between the gear pitch center of the small sprocket gear and the gear pitch center of the large sprocket gear. The interval L of the tangent paths is integral to the lengths of the sprocket chain link pieces. On the other hand, the U.S. Pat. No. 5,162,022 discloses a bicycle sprocket assembly, which is constructed on the basis of a theory that the interval L of the tangent paths of the sprocket chain is not integral to the lengths of the sprocket chain link pieces, and that the sprocket chain is engaged with the grooves of the large sprocket gear in a progressively slow pace.

The prior art disclosures referred to above place the emphasis on the first half of the gear-shifting process without regard to the second half of the gear-shifting process, in which the curved angle and the sideway deflection of the sprocket chain are important elements that must be taken into consideration so as to avert the incident of the mechanical interference of the sprocket gear by the sprocket chain.

SUMMARY OF THE INVENTION

It is therefore the primary objective of the present invention to provide a bicycle multi-step transmission sprocket assembly with means capable of attaining the action of a rapid gear-shifting process with precision.

It is another objective of the present invention to provide a bicycle multi-step transmission sprocket assembly with means capable of preventing the mechanical interference of the sprocket gear by the sprocket chain when the gear-shifting process is under way.

It is still another objective of the present invention to provide a bicycle multi-step transmission sprocket assembly capable of preventing the mechanical interference of the sprocket gear by the sprocket chain even if the interval between the sprocket gears of the cluster is relatively samll.

In keeping with the principle of the present invention, the foregoing objectives of the present invention are attained by a bicycle multi-step transmission sprocket assembly comprising a large sprocket gear, an intermediate sprocket gear, and a small sprocket gear. The intermediate sprocket gear is provided in the top surface of a predetermined tooth with a first recess and is further provided with a chain guiding slot located in the back side of a plurality of adjoining teeth along the reverse revolving direction of the predetermined tooth. The large sprocket gear is provided in the top surface of a predetermined number of teeth thereof with a second recess corresponding in location to the chain guiding slot of the intermediate sprocket gear in the reverse revolving direction. The sprocket chain is capable of shifting from the small sprocket gear to the intermediate sprocket gear with speed, thanks to the first recess and the chain guiding slot of the intermediate sprocket gear. The second recess of the large sprocket gear serves to avert the deflection of the sprocket chain so as to eliminate the mechanical interference of the large sprocket gear by the sprocket chain when the gear-shifting process is in progress.

The foregoing objectives, features, functions and advantages of the present invention will be more readily understood upon a thoughtful deliberation of the following detailed description of the embodiments of the present invention in conjunction with the accompanying drawings.

DETAILED DESCRIPTION OF THE INVENTION

Figure 1:
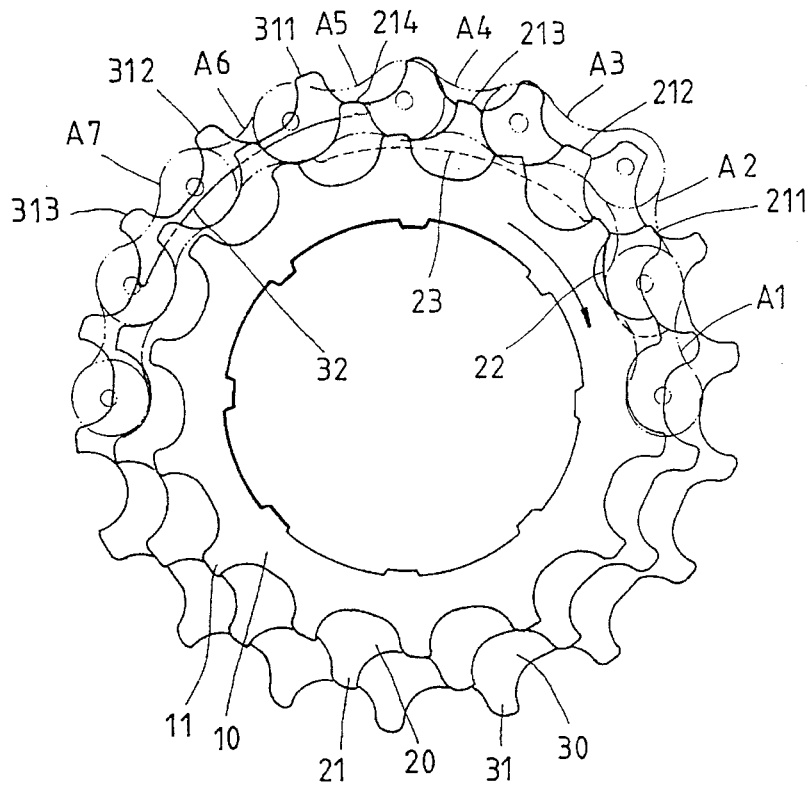
FIG. 1 shows a front schematic view of a first preferred embodiment of the present invention.
Figure 3:
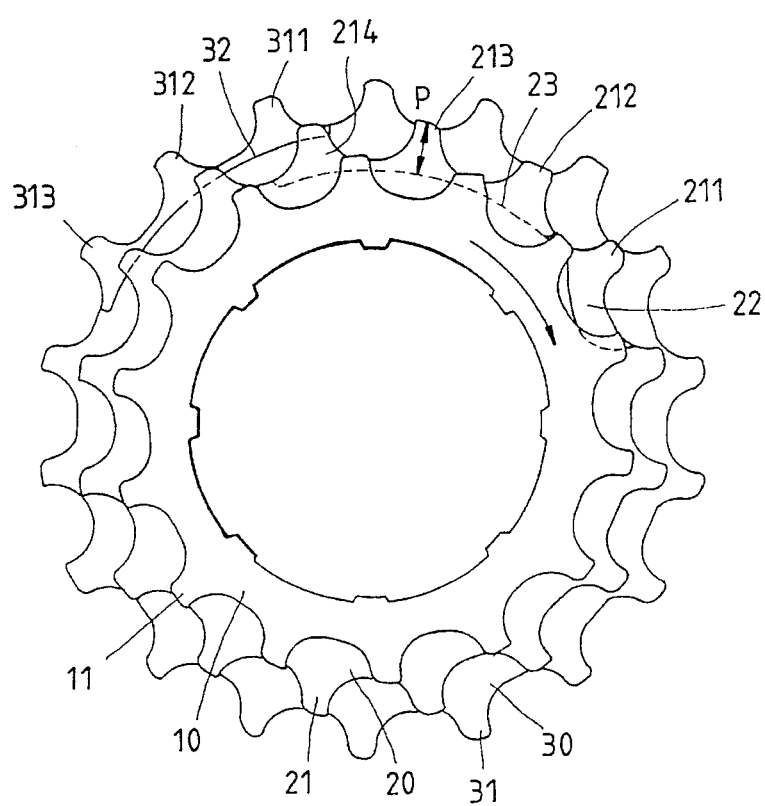
FIG. 3 shows a front elevational view of the first preferred embodiment of the present invention.

As shown in FIGS. 1–4, the first preferred embodiment of the present invention serves to illustrate a model by which a bicycle sprocket chain is shifted rapidly from one sprocket gear to another. In other words, when a sprocket chain designated as A is shifted from a small sprocket gear 10 to an intermediate sprocket gear 20, two link pieces A1 and A2 of the sprocket chain A are in the midst of moving toward the teeth of the intermediate sprocket gear 20 while another link piece A3 has already moved to the tooth of the intermediate sprocket gear 20. In the meantime, a link piece A4 next to the link piece A3 is engaged with the tooth groove of the intermediate sprocket gear 20. The model of the first preferred embodiment of the present invention serves to exemplify a bicycle gear-shifting process in which the sprocket chain A is shifted rapidly from the small sprocket gear 10 to the intermediate sprocket gear 20, with the least number of link pieces of the sprocket chain being involved to complete the engagement process.

A sprocket set of the first preferred embodiment of the present invention is composed of a small sprocket gear 10, an intermediate sprocket gear 20 and a large sprocket gear 30.

The small sprocket gear 10 has a predetermined number of teeth 11.

The intermediate sprocket gear 20 has a predetermined number of teeth 21 greater in number than the teeth 11 of the small sprocket gear 10. The intermediate sprocket gear 20 is provided in the top surface of a predetermined tooth 211 thereof with a first recess 22 having a predetermined depth and a predetermined arcuate shape. Located in the back side of three adjoining teeth 212, 213 and 214 along the reverse revolving direction of the tooth 211 is a chainguiding slot 23 having a predetermined depth and an internal insertion distance P greater than the straddling depth of the sprocket chain A link pieces riding on the teeth. The tooth 212 has a top surface of a predetermined inclination.

The large sprocket gear 30 has a predetermined number of teeth 31 greater in number than the teeth 21 of the intermediate sprocket gear 20. the large sprocket gear 30 is provided in the top surface of three adjoining teeth 311, 312 and 313 thereof with a second recess 32 corresponding in location obliquely in the reverse revolving direction to chain quiding slot 23 of the intermediate sprocket gear 20. It must be noted here that each of all teeth of the small sprocket gear 10, intermediate sprocket gear 20 and the large sprocket gear 30 has a top surface provided with a lead angle.

Figure 2:
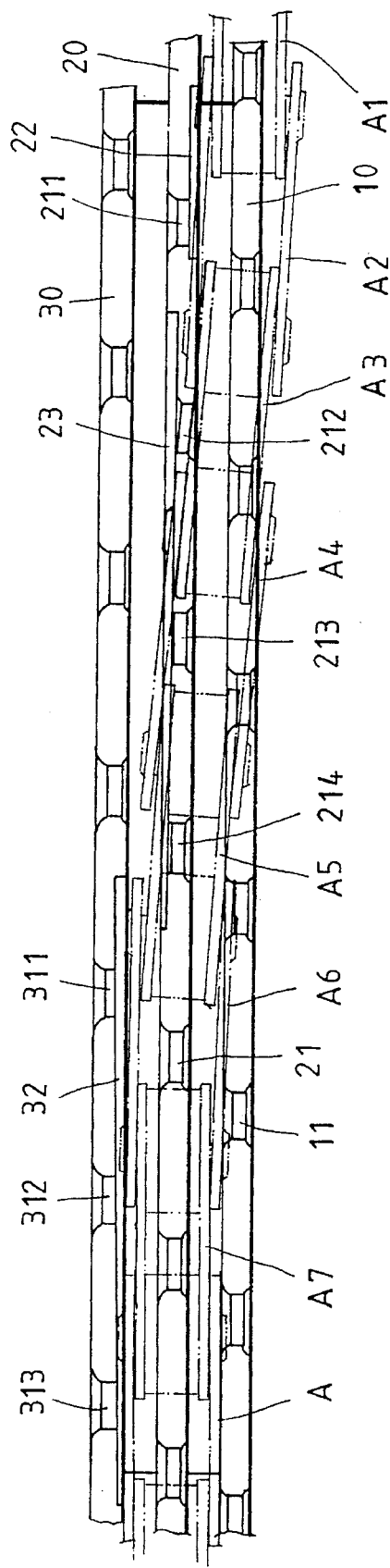
FIG. 2 shows a side schematic spread-out view of the first preferred embodiment of the present
Figure 4:
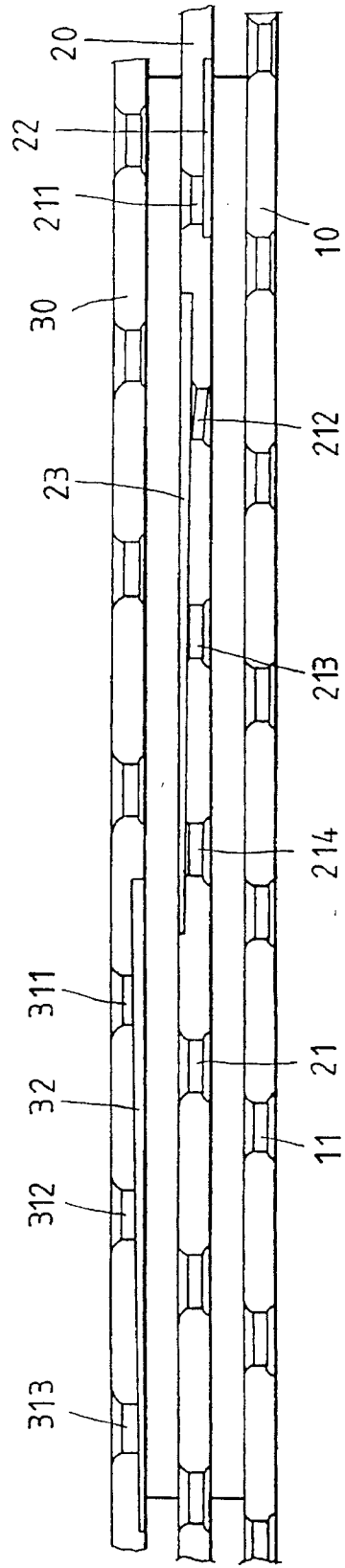
FIG. 4 shows a top spread-out view of the first preferred embodiment as shown in FIG. 3.

As shown in FIG. 2, the sprocket chain A has a deflection when the sprocket chain A is shifted from the samll sprocket chain 10 to the intermediate sprocket chain 20 such that the chain link pieces A1 and A2 are engaged with the tooth 211 of the intermediate sprocket gear 20, and that the chain link pieces A1 and A2 are caused by the first recess 22 of the intermediate sprocket gear 20 to have a predetermined deflection. In the meantime, the chain link piece A3 is engaged stably with the tooth 212 of the intermediate sprocket gear 20 while the chain link piece A4 is engaged with the groove of the tooth 213 of the intermediate sprocket gear 20. In a rapid gear-shifting process, the sprocket chain is always caused to deflect. As a result, the chain link pieces A3, A4, A5, A6 and A7 are caused by the chain guiding slot 23 of the intermediate sprocket chain 20 to engage rapidly and stably the teeth of the intermediate sprocket gear 20. In addition, the second recess 32 of the large sprocket gear 30 serves to prevent the chain link pieces from interfering the large sprocket gear 30. The link piece A3 of the chain A is engageable with the groove of the tooth 212 of the intermediate sprocket gear 20. The link pieces A4, A5, A6 and A7 of the chain A can be shifted rapidly and smoothly, thanks to the chain guiding slot 23 and the second recess 32.

Figure 5:
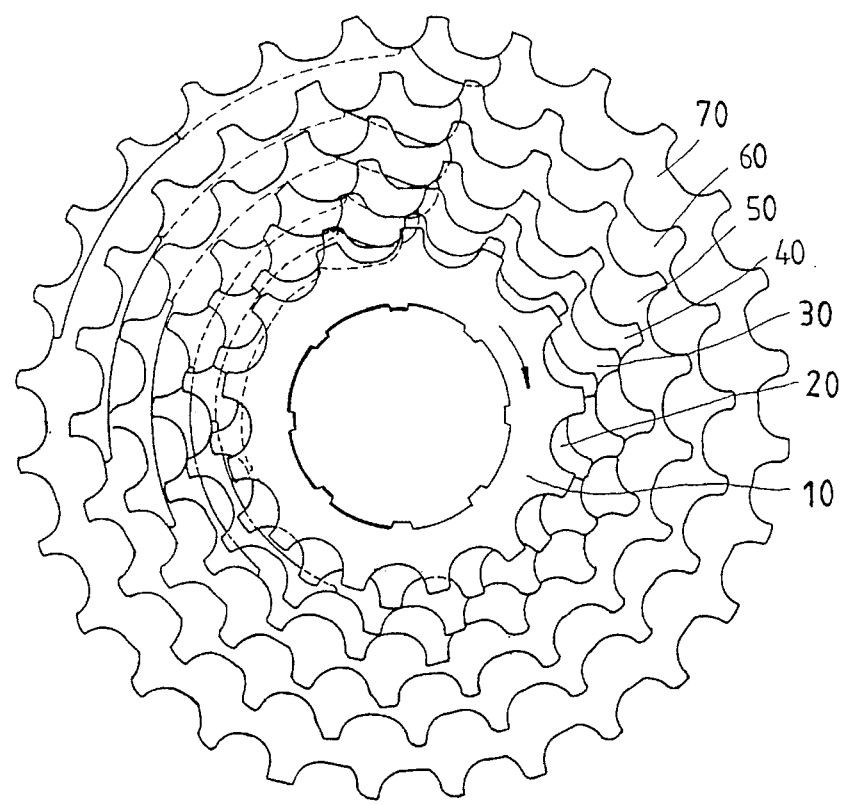
FIG. 5 shows a front elevational view of a second preferred embodiment of the present invention.

As shown in FIG. 5, the second preferred embodiment of the present invention cpmprises a sprocket set having a cluster of seven sprocket gears designated as 10, 20, 30, 40, 50, 60 and 70. The sprocket chain of the second preferred embodiment of the present invention is designed on the basis of the model in which three sprocket gears are considered as a basic combination. As a result, there are five basic combinations of 10–30, 20–40, 30–50, 40–60, and 50–70. Each of five combinations comprises the first recess, the chain guiding slot and the second recess so as to ensure that the sprocket chain can be shifted rapidly and smoothly without causing any mechanical interference.

Figure 6:
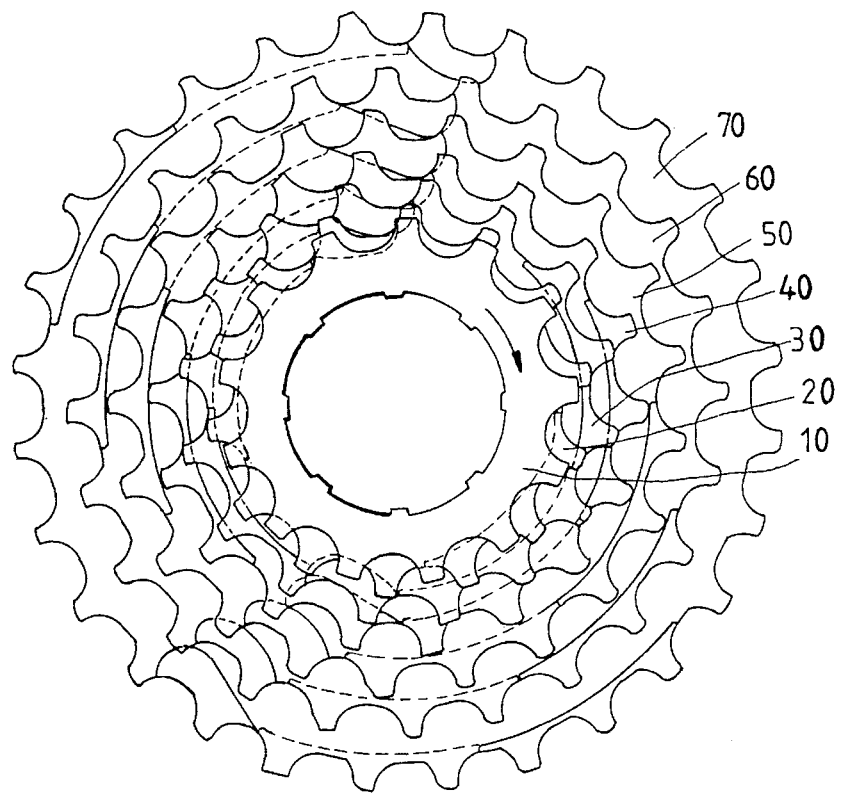
FIG. 6 shows a front elevational view of a third preferred embodiment of the present invention.

As shown in FIG. 6, the third preferred embodiment of the present invention is different from the second preferred embodiment of the present invention in that the former comprises the basic combinations having respectively two sets of the first recess, the chain guiding slots and the second recess. The present invention may be modified to comprise the basic combinations having respectively three sets of the first recess, the chain guiding slot and the second recess.

The chain guiding slot and the second recess of the present invention have respectively a width equal to the width of three teeth. In fact, the chain guiding slot and the second recess of the present invention may be constructed such that the width of the chain guiding slot and the width of the second recess may be dependent on the deflection of the sprocket chain and the size of the chain link piece. If the sprocket set comprises three sprocket gears as a basic combination, the first recess, the chain guiding slot and the second recess of each basic combination are arranged independently without being superimposed with the first recess, the chain guiding slot, and the second recess of another basic combination contiguous thereto.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A multi-step transmission sprocket assembly of a bicycle comprising a large sprocket gear, an intermediate sprocket gear and a small sprocket gear, said intermediate sprocket gear provided with a first recess located in a top surface of a tooth thereof, said intermediate sprocket gear further provided with a chain guiding slot located in a back side of a plurality of adjoining teeth thereof along a reverse revolving direction of said tooth, said large sprocket gear provided with a second recess located in a top surface of a plurality of teeth thereof, said second recess being corresponding obliquely in location to said chain guiding slot in a reverse revolving direction, said first recess and said chain guiding slot of said intermediate sprocket gear capable of causing a bicycle sprocket chain to be shifted rapidly and smoothly from said small sprocket gear to said intermediate sprocket gear, said second recess of said large sprocket gear capable of preventing said bicycle sprocket chain from interference with said large sprocket gear when said bicycle sprocket chain is deflected in a transmission process.

2. The multi-step transmission sprocket assembly of a bicycle as defined in claim 1, wherein said first recess has a predetermined shape.

3. The multi-step transimssion sprocket assembly of a bicycle as defined in claim 1, wherein said chain guiding slot has a depth greater than a straddling depth of a link piece of said bicycle sprocket chain and engaging a tooth groove of said intermediate sprocket gear.

4. The multi-step transmission sprocket assembly of a bicycle as defined in claim 1, wherein said intermediate sprocket gear has a tooth provided thereon with an inclined top surface, with said tooth being located next to said first recess along a reverse revolving direction.

5. The multi-step transmission sprocket assembly of a bicycle comprising a plurality of sprocket gears connected axially in sequence of sizes, with an intermediate sprocket gear of each three adjoining sprocket gears having a first recess located in a top surface of a tooth thereof, said intermediate sprocket gear further having a chain guiding slot located in a back side of a plurality of adjoining teeth along a reverse revolving direction of said tooth, said three adjoining sprocket gears comprising a large sprocket gear provided with a second recess located in a top surface of a plurality of teeth thereof, with said second recess being corresponding obliquely in location to said chain guiding slot in a reverse revolving direction, said first recess and said chain guiding slot of said intermediate sprocket gear capable of causing a bicycle sprocket chain to be shifted rapidly and smoothly from said small sprocket gear to said intermediate sprocket gear, said second recess of said large sprocket gear capable of preventing said bicycle sprocket chain from interference with said large sprocket gear when said bicycle sprocket chain is deflected in a transmission process.

6. The multi-step transmission sprocket assembly of a bicycle as defined in claim 5, wherein said first recess has a predetermined shape.

7. The multi-step transmission sprocket assembly of a bicycle as defined in claim 5, wherein said chain guiding slot has a depth greater than a straddling depth of a link piece of said bicycle sprocket chain and engaging a tooth groove of said intermediate sprocket gear.

8. The multi-step transmission sprocket assembly of a bicycle as defined in claim 5, wherein said interemdiate sprocket gear has a tooth provided thereon with an inclined top surface, with said tooth being located next to said first recess along a reverse revolving direction.

\* \* \* \* \*